United States Patent [19]

Mayer

[11] Patent Number: 4,673,212
[45] Date of Patent: Jun. 16, 1987

[54] CYCLE SEAT

[75] Inventor: William J. Mayer, Fall River Mills, Calif.

[73] Assignees: Don L. Russell; Donna J. Russell, both of Fall River Mills, Calif.

[21] Appl. No.: 891,275

[22] Filed: Jul. 28, 1986

[51] Int. Cl.[4] .............................................. B62J 1/00
[52] U.S. Cl. .................................... 297/195; 297/243; 297/284
[58] Field of Search ............... 297/195, 312, 284, 201, 297/243, 458

[56] References Cited

U.S. PATENT DOCUMENTS

| | | | |
|---|---|---|---|
| 3,880,467 | 4/1975 | Tischler | 297/458 |
| 4,462,634 | 7/1984 | Hanagan | 297/243 |
| 4,500,136 | 2/1985 | Murphy et al. | 297/284 |
| 4,541,668 | 9/1985 | Rouw | 297/312 |
| 4,566,733 | 1/1986 | Compton | 297/458 X |

*Primary Examiner*—James T. McCall
*Attorney, Agent, or Firm*—Leonard D. Schappert

[57] ABSTRACT

A cycle seat having adjustment capability facilitating adjustment of the contour of the cycle seat to compensate for differences in the crotch, rear buttocks and side buttocks areas of individual anatomies, thereby providing greater comfort to an individual utilizing the cycle seat.

9 Claims, 8 Drawing Figures

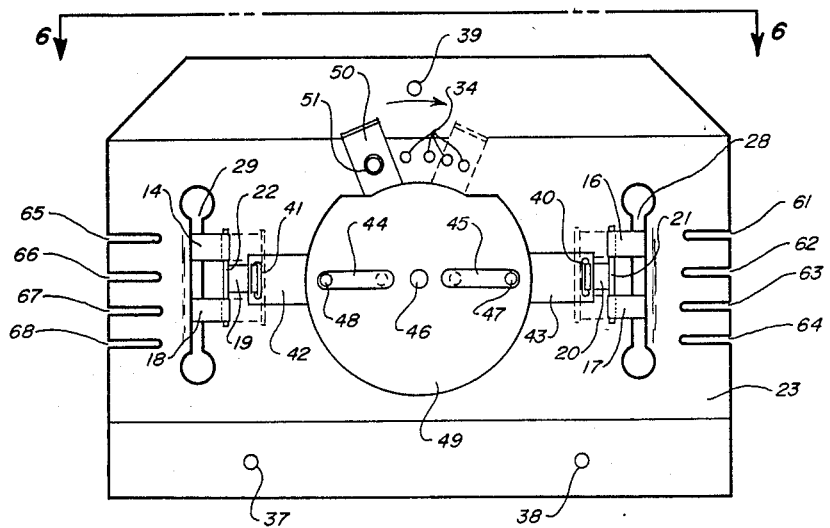
FIG. 5
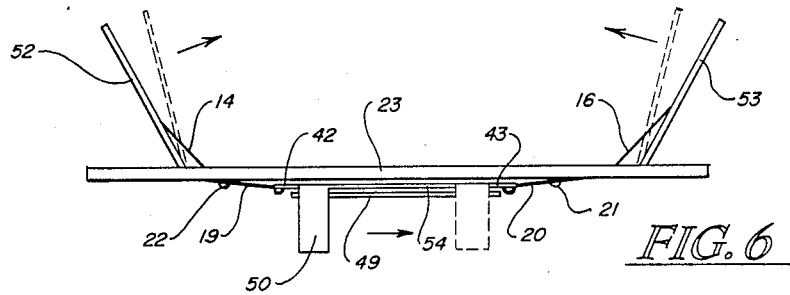
FIG. 6
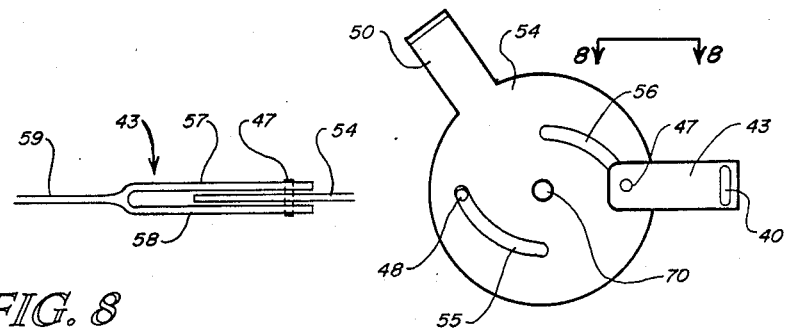
FIG. 8
FIG. 7

CYCLE SEAT

BACKGROUND OF THE INVENTION

1. Field of the Invention

The present invention relates generally to seats for use with motorcycles and bicycles and the like, and more specifically to seats which include an adjustment capability for modifying the support structure provided by the seat.

2. Description of the Prior Art

Motorcycles provided with modern seats by the factory generally include long, wedge-shaped seats that resemble a beam and are not designed to provide lateral support of the buttocks, nor to provide adjustability in the support structure of the seat. The reason for this is that, because the seat must be used by both short and tall riders, as well as by riders of different weights, this type of seat appears to be most economically feasible. Generally, a rider of a motorcycle moves forward or backward on the seat in order to find the most comfortable and supportive position of the seat for his particular physical structure.

While springs have been utilized in seating for many years to provide a shock absorption capability, and while some of the springs taught include adjusting means to stiffen them and to provide for adjustment of the tension of the springs to compensate for weakening over a period of time, such adjustments have not taught the unique features of the present invention.

Although there have in the past been attempts to accommodate the anatomies of different riders, none of the prior art has taught a cycle seat having the adjustment capability taught in the present invention.

SUMMARY OF THE INVENTION

The present invention provides a cycle seat which has lateral wings for side support and buttock support, adjustable flaps for rear buttock support and an adjustable flap for crotch support. The flaps designed to provide rear buttock support and crotch support are attached to a base. The lateral wings provided for side support of the buttocks are attached to a spring which is in turn attached to the base. Adjusting means attached to the base are provided for adjusting the tension of the lateral wings for side support of the buttocks. The base, lateral wings and flaps are then covered with foam or other material and an acceptable upholstery material such as vinyl or leather to form a cycle seat.

The primary object of the present invention is to provide a cycle seat having adjustment capability sufficient to adjust the contour of a cycle seat to give the necessary support to the buttocks and crotch area of the rider.

Another object of the present invention is to provide a cycle seat having sufficient adjustment capability to provide proper contour for the buttocks of a wide range of riders, taking into consideration age, size, weight and height.

A further object of the present invention is to provide sufficient adjustability of the seat to enable an individual rider to easily adjust the contour of the cycle seat during long-distance trips, thereby maximizing comfort.

The foregoing objects, as well as other objects and benefits of the present invention, are made more apparent by the descriptions and claims which follow.

BRIEF DESCRIPTION OF THE DRAWINGS

FIG. 5 is a bottom view of the base showing the adjustment means utilized in adjusting the tension on the wings of the cycle seat.

FIG. 6 is an end view of the base and associated structure of the cycle seat taken along lines 6—6 of FIG. 5.

FIG. 7 is a view of a plate used in the adjustment mechanism for adjusting the wings of the cycle seat.

FIG. 8 is a side view taken along lines 8—8 of FIG. 7 and showing how adjustment bar 43 attaches to adjustment plate 54.

DESCRIPTION OF THE PREFERRED EMBODIMENT

Figure 1:
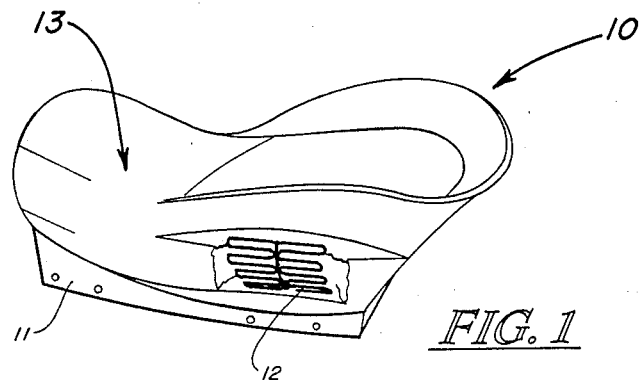
FIG. 1 is a perspective view of a cycle seat utilizing the present invention.

FIG. 1 of the drawings shows a complete cycle seat 10 which utilizes an outer padded portion 13 covering base 11, spring 12 and other interior parts as shown.

Figure 2:
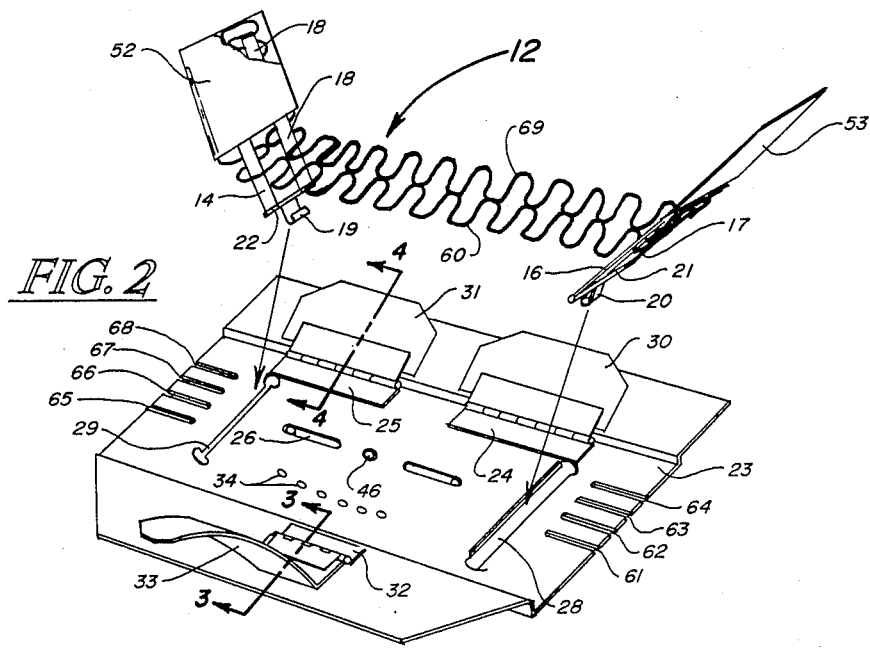
FIG. 2 is a perspective view showing the base of the cycle seat and part of the structure utilized in providing adjustability of the contour of the cycle seat.

FIG. 2 shows the internal structure of cycle seat 10. Base 23, consisting of a plate constructed of strong structural material, is attached to base 11 of FIG. 1 by screws, rivets or other attaching means. Base 23 includes slots 61, 62, 63 and 64 at one side and slots 65, 66, 67 and 68 at the other end. During assembly, spring 12 is positioned down against base 23, and spring sections 60 and 69 of spring 12 are interwoven into slots 61, 62, 63 and 64 at one side of base 23 and into slots 65, 66, 67 and 68 at the other side of base 23 to hold spring 12 in position on base 23. As spring 12 is positioned against base 23, straps 14 and 18 and connector 19, together with a pin 22 which attaches connector 19 to straps 14 and 18, are passed through slot 29 of base 23. Straps 16 and 17 and connector 20, with pin 21, which attaches connector 20 to straps 16 and 17, are passed through slot 28 of base 23. Means for adjusting the tension of straps 14, 16, 17 and 18 are provided at the bottom surface of the side of base 23, and will be discussed and shown in greater detail in FIG. 5 of the drawings. Pads 52 and 53 are provided to cover the ends of spring 12, creating a pair of wings useful for side support of buttocks and minimizing potential damage to the materials with which the padded portion 13 of cycle seat 10 is padded. Straps 14, 16, 17 and 18 are attached to spring sections 60 and 69 near the ends of spring sections 60 and 69 as shown in the cut-out area of pad 52. A crotch flap 33 is attached to base 23 by hinge 32, and is adjustable to allow modification of the contour of cycle seat 10 in the crotch area in order to make seat 10 more comfortable for the rider. Rear buttock flaps 30 and 31 are attached to base 23 by hinges 24 and 25 as shown, and are adjustable to allow cycle seat 10 to be contoured to the rear portion of the buttocks of the rider, and to increase the comfort and reduce the tension of the rider during long rides.

Figure 3:
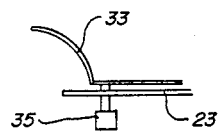
FIG. 3 is a cross-sectional view of the construction of the crotch flap showing its adjustability.
Figure 4:
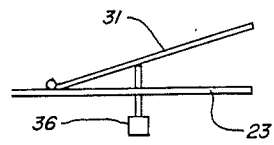
FIG. 4 is a cross-sectional view of one of the rear buttock flaps and its attachment to the base showing its adjustability.

FIGS. 3 and 4, which are taken respectively along lines 3—3 of FIG. 2 and 4—4 of FIG. 2, show the method of adjusting crotch flap 33 and rear buttock flaps 30 and 31. Specifically, note in FIG. 3 that an adjustment screw 35 threaded through base 23 is provided to adjust the vertical displacement of crotch flap 33 with respect to base 23. This allows for continuously adjustable contouring of the crotch area of cycle seat 10. Adjustment of rear buttock flap 31 is shown in FIG. 4. Note that an adjustment screw 36 extending through base 23 is provided which allows for adjusting the vertical displacement of buttock flap 31 with respect to base 23, thereby facilitating the adjustment of the rear portion of cycle seat 10 to fit the contour of the rider's buttocks. The adjustment capability of rear buttock flap 31 is typical, and substantially identical adjustment means, not shown specifically, are utilized for adjustment of rear buttock flap 30.

FIG. 5 of the drawings is a bottom view of base 23 showing how connectors 19 and 20 attach to adjustment bars 42 and 43. Note that there are slots 40 and 41 provided in adjustment bars 42 and 43 which facilitate attachment of connectors 19 and 20 thereto. Adjustment means are provided for moving adjustment bars 42 and 43 toward or away from each other to enable an individual to increase or decrease the tension on straps 14, 16, 17 and 18 for more or less support to the wings of cycle seat 10. Specifically, plate 49 is rigidly positioned as shown with respect to base 23 and having slots 44 and 45 cut therein. The position and size of slots 44 and 45 correspond with the position and size of slots 26 and 27 of base 23. Pins 47 and 48 extend through slots 44 and 45 and slots 27 and 28 respectively and are slidable therein. An adjusting plate, shown in FIG. 7 of the drawings, is positioned between base 23 and plate 49, and pivots on pin 46. Adjustment plate 54 includes elliptically shaped slots 55 and 56 through which pins 47 and 48 extend. Pins 47 and 48 also extend through adjustment bars 43 and 42 respectively. As a result, when arm 50 is moved to the position shown by dashed lines, pins 47 and 48 are pushed inward toward pin 46 and assume the position shown in dashed lines, pulling adjustment bars 42 and 43 in toward pin 46 and increasing tension on straps 14, 16, 17 and 18. A latch mechanism consisting of holes 51 in base 23 and spring-loaded key 51 positioned on arm 50 is provided to lock adjustment plate 54 in various positions. Holes 34 are provided in base 23, and spring-loaded key 51 is positioned on arm 50 so that when spring-loaded key 51 is released into position in one of the holes 34, it locks the position of arm 50 with respect to base 23. Threaded holes 38 and 39 are provided for use with adjustment screws 35 and 36 to facilitate adjustment of crotch flap 33 and buttock flap 31, and threaded hole 37 is provided with an adjustment screw to facilitate adjustment of buttock flap 30.

FIG. 6 of the drawings is an end view of base 23 taken along lines 6—6 of FIG. 5. Adjustment plate 54 is positioned between plate 49 and base 23, and adjustment bars 42 and 43 are attached to connectors 19 and 20 as shown. As arm 50 of adjustment plate 54 is moved from the solid position to the dashed position in FIG. 6, adjustment bars 42 and 43 exert pull on straps 14, 16, 17 and 18 and move pads 52 and 53 from the position shown in solid lines to the position shown by dashed lines and in the direction of the arrows to increase the support for the rider's buttocks. As the rider sits on cycle seat 10, straps 14 and 16 are depressed, pulling harder on the wings and giving stronger side buttock support.

In FIG. 7 of the drawings, note that adjustment plate 54 includes an arm 50 for adjusting it back and forth, and further includes a hole 70 through which pin 46 extends. Slots 55 and 56, which facilitate the attachment of adjustment bars 42 and 43, are shaped elliptically so that they pull and push adjustment bars 42 and 43 inward or outward as adjustment plate 54 is rotated. Adjustment bar 43 is attached to adjustment plate 54 by means of pin 47, which extends through adjustment bar 43 and slot 56 of adjustment plate 54.

FIG. 8 shows the attachment of adjustment bar 43 to adjustment plate 54 in greater detail. Adjustment bar 43 consists of two arms, 57 and 58, forming a yoke which extends around adjustment plate 54 as shown, and is attached thereto by pin 47. Adjustment bar 43 further includes an extension 59, which attaches to connector 20 as shown in FIG. 5.

While the foregoing description of the invention has shown a preferred embodiment using specific terms, such description is presented for illustrative purposes only. It is applicant's intention that changes and variations may be made without departure from the spirit or scope of the following claims, and this disclosure is not intended to limit applicant's protection in any way.

I claim:

1. A seat structure for use with cycle seats, comprising:
    a base having a front end, a rear end, a left side, a right side, a top surface and a bottom surface and at least one slot near said left side and at least one slot near said right side;
    a pair of lateral wings extending upward from said top surface of said base and laterally over said right side and said left side of said base;
    spring means supporting each of said lateral wings and resisting laterally outward and downward forces, said spring means being attached to said base and having free ends extending outward therefrom in each of said lateral wings;
    strap means attached proximate to said free ends of said spring means and extending above said spring means and through said slots in said base, and adjustment means consisting substantially of:
        a plate pivotally attached to said base;
        locking means for holding said plate in position, and
        attaching means attaching said plate to said strap means whereby tension on said strap means changes as said plate is rotated with respect to said base.

2. A seat structure for use with cycle seats, comprising:
    a base having a front end, a rear end, a left side, a right side, a top surface and a bottom surface;
    a pair of lateral wings extending upward from said top surface of said base and laterally over said right side and said left side of said base;
    spring means supporting each of said lateral wings and resisting laterally outward and downward forces, said spring means being attached to said base and having free ends extending outward therefrom in each of said lateral wings;
    a crotch support positioned near said front end of said base, attached to said base and extending upward from said top surface of said base;
    a first buttock support positioned near said rear end and said right side of said base, attached to said base by first hinge means;

a second buttock support positioned near said rear end and said left side of said base, attached to said base by second hinge means;

a first adjustment means whereby the position of said first buttock support is adjustable with respect to said base, and a second adjustment means whereby the position of said second buttock support is adjustable with respect to said base.

3. A seat structure for use with cycle seats, comprising:

a base having a front end, a rear end, a left side, a right side, a top surface and a bottom surface;

a pair of lateral wings extending upward from said top surface of said base and laterally over said right side and said left side of said base;

spring means supporting each of said lateral wings and resisting laterally outward and downward forces, said spring means being attached to said base and having free ends extending outward therefrom in each of said lateral wings;

a crotch support positioned near said front end of said base, attached to said base by first hinge means and extending upward from said top surface of said base;

first adjustment means whereby the position of said crotch support is adjustable with respect to said base;

a first buttock support positioned near said rear end and said right side of said base, attached to said base by second hinge means;

second adjustment means whereby the position of said first buttock support is adjustable with respect to said base;

a second buttock support positioned near said rear end and said left side of said base, attached to said base by third hinge means, and third adjustment means whereby the position of said second buttock support is adjustable with respect to said base.

4. A seat structure for use with cycle seats, comprising:

a base having a frong end, a rear end, a left side, a right side, a top surface, a bottom surface, at least one slot near said left side of said base, and at least one slot near said right side of said base;

a pair of lateral wings extending upward from said top surface of said base and laterally over said right side and said left side of said base;

spring means supporting each of said lateral wings and resisting laterally outward and downward forces, said spring means being attached to said base and having free ends extending outward therefrom in each of said lateral wings;

a crotch support positioned near said front end of said base and attached to said base and extending upward from said top surface of said base;

a buttock support positioned near said rear end of said base and attached to said base and extending upward from said top surface of said base, and strap means attached proximate to said free ends of said spring means and extending above said spring means and through said slots in said base, and adjustment means consisting of:
a plate pivotally attached to said base;
locking means for holding said plate in position, and
attaching means attaching said plate to said strap means whereby tension on said strap means changes as said plate is rotated with respect to said base.

5. A seat structure for use with cycle seats, comprising:

a base having a front end, a rear end, a left side, a right side, a top surface, a bottom surface, at least one slot near said left side of said base and at least one slot near said right side of said base a pair of lateral wings extending upward from said top surface of said base and laterally over said right side and said left side of said base;

spring means supporting each of said lateral wings and resisting laterally outward and downward forces, said spring means being attached to said base and having free ends extending outward therefrom in each of said lateral wings;

a crotch support positioned near said front end of said base, attached to said base by first hinge means and extending upward from said top surface of said base;

first adjustment means whereby the position of said crotch support is adjustable with respect to said base;

a buttock support positioned near said rear end of said base, attached to said base by second hinge means and extending upward from said top surface of said base;

second adjustment means whereby the position of said buttock support is adjustable with respect to said base;

strap means attached proximate to said free ends of said spring means and extending above said spring means and through said slots in said base;

third adjustment means consisting of:
a plate pivotally attached to said base;
locking means for holding said plate in position, and
attaching means attaching said plate to said strap means whereby tension on said strap means changes as said plate is rotated with respect to said base.

6. The invention of claim 2, wherein said base has at least one slot near said left side of said base and at least one slot near said right side of said base, and including:

strap means attached proximate to said free ends of said spring means and extending above said spring means and through said slots in said base, and adjustment means consisting of:
a plate pivotally attached to said base;
locking means for holding said plate in position, and
attaching means attaching said plate to said strap means whereby tension on said strap means changes as said plate is rotated with respect to said base.

7. A seat structure for use with cycle seats, comprising:

a base having a front end, a rear end, a.left side, a right side, a top surface and a bottom surface;

a pair of lateral wings extending upward from said top surface of said base and laterally over said right side and said left side of said base;

spring means supporting each of said lateral wings and resisting laterally outward and downward forces, said spring means being attached to said base and having free ends extending outward therefrom in each of said lateral wings;

a crotch support positioned near said front end of said base and extending upward from said top surface of said base, attached to said base by first hinge means positioned nearer to said front end of said base than to said rear end of said base;

first adjustment means whereby the position of said crotch support is adjustable with respect to said base;

a buttock support positioned near said rear end of said base, attached to said base and extending upward from said top surface of said base.

8. The invention of claim 7, wherein said buttock support is attached to said base by second hinge means positioned nearer to said rear end of said base than to said front end of said base and including second adjustment means whereby the position of said buttock support is adjustable with respect to said base.

9. A seat structure for use with cycle seats, comprising:

a base having a front end, a rear end, a left side, a right side, a top surface and a bottom surface;

a pair of lateral wings extending upward from said top surface of said base and laterally over said right side and said left side of said base;

spring means supporting each of said lateral wings and resisting laterally outward and downward forces, said spring means being attached to said base and having free ends extending outward therefrom in each of said lateral wings;

a crotch support positioned near said front end of said base and attached to said base and extending upward from said top surface of said base;

a buttock support positioned near said rear end of said base and extending upward from said top surface of said base, attached to said base by hinge means positioned nearer to said rear end of said base than to said front end of said base, and adjustment means whereby the position of said buttock support is adjustable with respect to said base.

* * * * *